US007996541B2

(12) United States Patent
Marathe et al.

(10) Patent No.: US 7,996,541 B2
(45) Date of Patent: Aug. 9, 2011

(54) METHODS, SYSTEMS, AND COMPUTER PROGRAM PRODUCTS FOR IDENTIFYING A SERVING HOME SUBSCRIBER SERVER (HSS) IN A COMMUNICATIONS NETWORK

(75) Inventors: Rohini Marathe, Cary, NC (US); Peter J. Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 983 days.

(21) Appl. No.: 11/888,907

(22) Filed: Aug. 2, 2007

(65) Prior Publication Data
US 2008/0311917 A1    Dec. 18, 2008

Related U.S. Application Data

(60) Provisional application No. 60/934,703, filed on Jun. 15, 2007.

(51) Int. Cl.
*G06F 15/16* (2006.01)
(52) U.S. Cl. ......... 709/227; 709/203; 709/217; 370/353
(58) Field of Classification Search .................. 709/203, 709/217, 227; 370/352
See application file for complete search history.

(56) References Cited

U.S. PATENT DOCUMENTS

| 4,310,727 A | 1/1982 | Lawser |
| 4,754,479 A | 6/1988 | Bicknell et al. |
| 5,089,954 A | 2/1992 | Rago |
| 5,237,604 A | 8/1993 | Ryan |
| 5,247,571 A | 9/1993 | Kay et al. |
| 5,251,248 A | 10/1993 | Tokunaga et al. |
| 5,400,390 A | 3/1995 | Salin |
| 5,422,941 A | 6/1995 | Hasenauer et al. |
| 5,423,068 A | 6/1995 | Hecker |
| 5,430,719 A | 7/1995 | Weisser, Jr. |
| 5,442,683 A | 8/1995 | Hoogeveen |
| 5,455,855 A | 10/1995 | Hokari |
| 5,457,736 A | 10/1995 | Cain et al. |
| 5,481,603 A | 1/1996 | Gutierrez et al. |

(Continued)

FOREIGN PATENT DOCUMENTS

EP    0 512 962 A2    11/1992

(Continued)

OTHER PUBLICATIONS

Notification of Transmittal of the International Search Report and The Written Opinion of the International Searching Authority, or the Declaration for International application No. PCT/US2009/036538 (Sep. 30, 2009).

(Continued)

*Primary Examiner* — Phuoc Nguyen
(74) *Attorney, Agent, or Firm* — Jenkins, Wilson, Taylor & Hunt, P.A.

(57) ABSTRACT

Methods, systems, and computer program products for determining a serving home subscriber server (HSS) in a communications network are described. One method includes obtaining a subscriber identifier from a query message. An exceptions-based data structure contained in a database is accessed to locate a database entry associated with the subscriber identifier. Similarly, a range-based data structure contained in the database is accessed to locate the database entry associated with the subscriber identifier if the exceptions-based data structure does not contain the database entry. The method also includes acquiring serving HSS data corresponding to the located entry from either the exceptions-based data structure or the range-based data structure.

25 Claims, 6 Drawing Sheets

U.S. PATENT DOCUMENTS

| | | |
|---|---|---|
| 5,502,726 A | 3/1996 | Fischer |
| 5,504,804 A | 4/1996 | Widmark et al. |
| 5,526,400 A | 6/1996 | Nguyen |
| 5,579,372 A | 11/1996 | Åström |
| 5,590,398 A | 12/1996 | Matthews |
| 5,594,942 A | 1/1997 | Antic et al. |
| 5,623,532 A | 4/1997 | Houde et al. |
| 5,689,548 A | 11/1997 | Maupin et al. |
| 5,706,286 A | 1/1998 | Reiman et al. |
| 5,711,002 A | 1/1998 | Foti |
| 5,819,178 A | 10/1998 | Cropper |
| 5,822,694 A | 10/1998 | Coombes et al. |
| 5,832,382 A | 11/1998 | Alperovich |
| 5,854,982 A | 12/1998 | Chambers et al. |
| 5,878,347 A | 3/1999 | Joensuu et al. |
| 5,878,348 A | 3/1999 | Foti |
| 5,890,063 A | 3/1999 | Mills |
| 5,953,662 A | 9/1999 | Lindquist et al. |
| 5,953,663 A | 9/1999 | Maupin et al. |
| 5,983,217 A | 11/1999 | Khosravi-Sichannie et al. |
| 6,006,098 A | 12/1999 | Rathnasabapathy et al. |
| 6,011,803 A | 1/2000 | Bicknell et al. |
| 6,014,557 A | 1/2000 | Morton et al. |
| 6,018,657 A | 1/2000 | Kennedy, III et al. |
| 6,038,456 A | 3/2000 | Colby et al. |
| 6,049,714 A | 4/2000 | Patel |
| 6,097,960 A | 8/2000 | Rathnasabapathy et al. |
| 6,115,463 A | 9/2000 | Coulombe et al. |
| H1895 H | 10/2000 | Hoffpauir et al. |
| 6,128,377 A | 10/2000 | Sonnenberg |
| 6,137,806 A | 10/2000 | Martinez |
| 6,138,016 A | 10/2000 | Kulkarni et al. |
| 6,138,017 A | 10/2000 | Price et al. |
| 6,138,023 A | 10/2000 | Agarwal et al. |
| 6,144,857 A | 11/2000 | Price et al. |
| 6,148,204 A | 11/2000 | Urs et al. |
| 6,192,242 B1 | 2/2001 | Rollender |
| 6,205,210 B1 | 3/2001 | Rainey et al. |
| 6,226,517 B1 | 5/2001 | Britt et al. |
| 6,236,365 B1 | 5/2001 | LeBlanc et al. |
| 6,263,212 B1 | 7/2001 | Ross et al. |
| 6,308,075 B1 | 10/2001 | Irten et al. |
| 6,327,350 B1 | 12/2001 | Spangler et al. |
| 6,377,674 B1 | 4/2002 | Chong et al. |
| 6,411,632 B2 | 6/2002 | Lindgren et al. |
| 6,424,832 B1 | 7/2002 | Britt et al. |
| 6,434,144 B1 | 8/2002 | Romanov |
| 6,463,055 B1 | 10/2002 | Lupien et al. |
| 6,505,046 B1 | 1/2003 | Baker |
| 6,515,997 B1 | 2/2003 | Feltner et al. |
| 6,535,746 B1 | 3/2003 | Yu et al. |
| 6,539,077 B1 | 3/2003 | Ranalli et al. |
| 6,560,216 B1 | 5/2003 | McNiff et al. |
| 6,560,456 B1 | 5/2003 | Lohtia et al. |
| 6,574,481 B1 | 6/2003 | Rathnasabapathy et al. |
| 6,577,723 B1 | 6/2003 | Mooney |
| 6,594,258 B1 | 7/2003 | Larson et al. |
| 6,611,516 B1 | 8/2003 | Pirkola et al. |
| 6,643,511 B1 | 11/2003 | Rune et al. |
| 6,662,017 B2 | 12/2003 | McCann et al. |
| 6,683,881 B1 | 1/2004 | Mijares et al. |
| 6,684,073 B1 | 1/2004 | Joss et al. |
| 6,731,926 B1 | 5/2004 | Link, II et al. |
| 6,738,636 B2 | 5/2004 | Lielbriedis |
| 6,748,057 B2 | 6/2004 | Ranalli et al. |
| 6,775,737 B1 | 8/2004 | Warkhede et al. |
| 6,795,701 B1 | 9/2004 | Baker et al. |
| 6,836,477 B1 | 12/2004 | West, Jr. et al. |
| 6,839,421 B2 | 1/2005 | Esparza et al. |
| 6,871,070 B2 | 3/2005 | Ejzak |
| 6,885,872 B2 | 4/2005 | McCann et al. |
| 6,917,612 B2 | 7/2005 | Foti et al. |
| 6,950,441 B1 | 9/2005 | Kaczmarczyk et al. |
| 6,993,038 B2 | 1/2006 | McCann |
| 7,010,002 B2 | 3/2006 | Chow et al. |
| 7,027,582 B2 | 4/2006 | Khello et al. |
| 7,035,239 B2 | 4/2006 | McCann et al. |
| 7,039,037 B2 | 5/2006 | Wang et al. |
| 7,054,652 B2 | 5/2006 | Luis |
| 7,079,524 B2 | 7/2006 | Bantukul et al. |
| 7,079,853 B2 | 7/2006 | Rathnasabapathy et al. |
| 7,092,505 B2 | 8/2006 | Allison et al. |
| 7,170,982 B2 | 1/2007 | Li et al. |
| 7,221,952 B2 | 5/2007 | Cho et al. |
| 7,274,683 B2 | 9/2007 | Segal |
| 7,286,839 B2 | 10/2007 | McCann et al. |
| 7,366,530 B2 | 4/2008 | McCann et al. |
| 7,397,773 B2 | 7/2008 | Qu et al. |
| 7,551,608 B1 | 6/2009 | Roy |
| 7,715,367 B2 | 5/2010 | Nishida et al. |
| 7,746,864 B1 | 6/2010 | Asawa et al. |
| 7,751,386 B2 | 7/2010 | Kobayashi et al. |
| 7,787,445 B2 | 8/2010 | Marsico |
| 7,889,716 B2 | 2/2011 | Tejani et al. |
| 2001/0029182 A1 | 10/2001 | McCann et al. |
| 2001/0030957 A1 | 10/2001 | McCann et al. |
| 2001/0040957 A1 | 11/2001 | McCann et al. |
| 2002/0054674 A1 | 5/2002 | Chang et al. |
| 2002/0147845 A1* | 10/2002 | Sanchez-Herrero et al. .. 709/245 |
| 2002/0173320 A1 | 11/2002 | Aitken et al. |
| 2002/0176382 A1 | 11/2002 | Madour et al. |
| 2003/0007482 A1 | 1/2003 | Khello et al. |
| 2003/0026289 A1 | 2/2003 | Mukherjee et al. |
| 2003/0054844 A1 | 3/2003 | Anvekar et al. |
| 2003/0065788 A1 | 4/2003 | Salomaki |
| 2003/0081754 A1 | 5/2003 | Esparza et al. |
| 2003/0109271 A1 | 6/2003 | Lewis et al. |
| 2003/0128693 A1 | 7/2003 | Segal |
| 2003/0193967 A1 | 10/2003 | Fenton et al. |
| 2003/0227899 A1 | 12/2003 | McCann |
| 2004/0003114 A1 | 1/2004 | Adamczyk |
| 2004/0076126 A1 | 4/2004 | Qu et al. |
| 2004/0081206 A1 | 4/2004 | Allison et al. |
| 2004/0082332 A1 | 4/2004 | McCann et al. |
| 2004/0087300 A1 | 5/2004 | Lewis |
| 2004/0125925 A1 | 7/2004 | Marsot |
| 2004/0141488 A1 | 7/2004 | Kim et al. |
| 2004/0142707 A1 | 7/2004 | Midkiff et al. |
| 2004/0198351 A1 | 10/2004 | Knotts |
| 2004/0202187 A1 | 10/2004 | Kelly et al. |
| 2004/0243596 A1 | 12/2004 | Lillqvist et al. |
| 2004/0246965 A1* | 12/2004 | Westman et al. ............ 370/392 |
| 2005/0119017 A1 | 6/2005 | Lovell, Jr. et al. |
| 2005/0182781 A1 | 8/2005 | Bouvet |
| 2005/0286531 A1 | 12/2005 | Tuohino et al. |
| 2006/0002308 A1* | 1/2006 | Na et al. ...................... 370/252 |
| 2006/0034256 A1 | 2/2006 | Addagatla et al. |
| 2006/0067338 A1 | 3/2006 | Hua et al. |
| 2006/0072726 A1 | 4/2006 | Klein et al. |
| 2006/0095575 A1 | 5/2006 | Sureka et al. |
| 2006/0098621 A1 | 5/2006 | Plata et al. |
| 2006/0136557 A1* | 6/2006 | Schaedler et al. ............ 709/203 |
| 2006/0165068 A1 | 7/2006 | Dalton et al. |
| 2006/0245573 A1 | 11/2006 | Sheth et al. |
| 2006/0293021 A1 | 12/2006 | Zhou |
| 2007/0019625 A1 | 1/2007 | Ramachandran et al. |
| 2007/0061397 A1* | 3/2007 | Gregorat et al. ............. 709/203 |
| 2007/0104184 A1 | 5/2007 | Ku et al. |
| 2007/0115934 A1* | 5/2007 | Dauster et al. ............... 370/352 |
| 2007/0116250 A1* | 5/2007 | Stafford ................... 379/355.09 |
| 2007/0133574 A1 | 6/2007 | Tejani et al. |
| 2007/0203909 A1 | 8/2007 | Marathe |
| 2007/0286379 A1 | 12/2007 | Wiatrowski et al. |
| 2008/0114862 A1 | 5/2008 | Moghaddam et al. |
| 2008/0130856 A1 | 6/2008 | Ku et al. |
| 2008/0247526 A1* | 10/2008 | Qiu et al. ................. 379/142.06 |
| 2008/0258575 A1* | 10/2008 | Sadiku et al. ................ 310/207 |
| 2008/0281975 A1* | 11/2008 | Qiu et al. ..................... 709/230 |
| 2009/0022146 A1 | 1/2009 | Huang |
| 2009/0043704 A1 | 2/2009 | Bantukul et al. |
| 2009/0103707 A1 | 4/2009 | McGary et al. |
| 2009/0227276 A1 | 9/2009 | Agarwal et al. |
| 2009/0264112 A1 | 10/2009 | De Zen et al. |
| 2010/0020728 A1 | 1/2010 | Jefferson et al. |
| 2010/0285800 A1 | 11/2010 | McCann |
| 2011/0116382 A1 | 5/2011 | McCann et al. |
| 2011/0126277 A1 | 5/2011 | McCann et al. |

FOREIGN PATENT DOCUMENTS

| | | |
|---|---|---|
| EP | 0 936 825 A3 | 8/1999 |
| EP | 0 944 276 A1 | 9/1999 |
| EP | 1 285 545 B1 | 10/2004 |
| EP | 1 558 004 A | 7/2005 |
| EP | 1 742 452 A1 | 1/2007 |
| KR | 2000-0037801 | 7/2000 |
| KR | 2003-0040291 A1 | 5/2003 |
| KR | 10-2004-0107271 A | 12/2004 |
| WO | WO 95/12292 A1 | 5/1995 |
| WO | WO 96/11557 | 4/1996 |
| WO | WO 97/33441 A1 | 9/1997 |
| WO | WO 98/18269 | 4/1998 |
| WO | WO 98/56195 | 12/1998 |
| WO | WO 99/11087 A2 | 3/1999 |
| WO | WO 99/57926 | 11/1999 |
| WO | WO 00/16583 A1 | 3/2000 |
| WO | WO 00/60821 | 10/2000 |
| WO | WO 01/47297 A2 | 6/2001 |
| WO | WO 01/54444 A1 | 7/2001 |
| WO | WO 03/005664 A2 | 1/2003 |
| WO | WO 03/021982 A1 | 3/2003 |
| WO | WO 03/105382 A1 | 12/2003 |
| WO | WO 2004/006534 | 1/2004 |
| WO | WO 2004/087686 A | 1/2004 |
| WO | WO 2004/075507 | 9/2004 |
| WO | WO 2004/102345 A2 | 11/2004 |
| WO | WO 2005/013538 A3 | 2/2005 |
| WO | WO 2006/072473 A1 | 7/2006 |
| WO | WO 2007/045991 A1 | 4/2007 |
| WO | WO 2007/064943 A2 | 6/2007 |
| WO | WO 2007/092205 A2 | 8/2007 |
| WO | WO 2007/146257 A2 | 12/2007 |
| WO | WO 2008/011101 A2 | 1/2008 |
| WO | WO 2009/023573 A2 | 2/2009 |
| WO | WO 2009/070179 A1 | 6/2009 |

OTHER PUBLICATIONS

Supplementary European Search Report for European application No. 04751843.6 (Aug. 7, 2009).
Communication pursuant to Article 94(3) EPC for European application No. 06844747.3 (Jul. 28, 2009).
Supplementary European Search Report for European Application No. 06844747.3 (Apr. 24, 2009).
Official Action for U.S. Appl. No. 11/291,502 (May 13, 2009).
Commonly assigned, co-pending U.S. Appl. No. 12/400,576 for, "Methods, Systems, and Computer Readable media for Routing a Message Service Message Trhough a Communications Network," filed Mar. 9, 2009.
Notification Concerning Transmittal of International Preliminary Report on Patentability for International Application No. PCT/US2006/046108 (Oct. 2, 2008).
Notification of Transmittal of the International Search Report and the Written Opinion of the International Searching Authority, or the Declaration for International Application No. PCT/US2006/046108 (Sep. 9, 2008).
Communication of European publication number and information on the application of Article 67(3) EPC for Application No. 06844747.3 (Jul. 23, 2008).
Notice of Allowance and Fee(s) Due for U.S. Appl. No. 11/112,126 (Mar. 28, 2008).
Notice of Allowance and Fee(s) Due for U.S. Appl. No. 11/112,126 (Dec. 17, 2007).
Official Action for U.S. Appl. No. 11/112,126 (Jun. 15, 2007).
Communication pursuant to Rules 109 and 110 EPC for European Application No. 04751843.6 (Dec. 16, 2005).
Notification Concerning Transmittal of International Preliminary Report on Patentability (Chapter I of the Patent Cooperation Treaty) in International Application No. PCT/US2004/014645 (Nov. 24, 2005).
Supplemental Notice of Allowance and Fee(s) Due for U.S. Appl. No. 10/842,394 (Feb. 9, 2005).
Notification of Transmittal of the International Search Report and the Written Opinion of the International Searching Authority, or the Declaration for International Application No. PCT/US2004/014645 (Dec. 16, 2004).

Notice of Allowance and Fee(s) Due for U.S. Appl. No. 10/842,394 (Dec. 15, 2004).
Notification of Transmittal of the International Search Report and the Written Opinion of the International Searching Authority, or the Declaration for International Application No. PCT/US04/06247 (Nov. 10, 2004).
"IP Multimedia Subsystem," printout from wikipedia.org, Wikimedia Foundation, Inc. (May 29, 2007).
"HP OpenCall Home Subscriber Server software—Data sheet", 4AA0-3360ENRW Rev. 2, Hewlett-Packard Development Company, L.P. (Jul. 2006).
"Diameter Overview," referenced from www.ulticom.com/html/products/signalware-diameter-reference-guide.asp (publication date unknown).
Notification of Transmittal of the International Search Report and the Written Opinion of the International Searching Authority, or the Declaration for International Application No. PCT/US2008/072641 (Feb. 24, 2009).
Notification of Transmittal of the International Search Report and the Written Opinion of the International Searching Authority, or the Declaration for International Application No. PCT/US2008/066675 (Dec. 9, 2008).
Notice of Allowance for U.S. Appl. No. 10/729,519 (Jul. 30, 2007).
Official Action for U.S. Appl. No. 10/729,519 (Nov. 28, 2006).
Notification Concerning Transmittal of International Preliminary Report on Patentability for International Application No. PCT/US2004/024328 (Jul. 20, 2006).
Notice of Allowance for U.S. Appl. No. 10/631,586 (May 25, 2006).
Notification of Transmittal of the International Search Report or the Declaration and Written Opinion of the International Searching Authority for International Application No. PCT/US2004/024328 (Apr. 25, 2006).
Supplemental Notice of Allowance for U.S. Appl. No. 09/747,070 (Feb. 10, 2006).
Notice of Allowance for U.S. Appl. No. 09/747,070 (Dec. 2, 2005).
Interview Summary for U.S. Appl. No. 09/747,070 (Dec. 2, 2005).
Advisory Action for U.S. Appl. No. 09/747,070 (Nov. 1, 2005).
Official Action for U.S. Appl. No. 10/631,586 (Oct. 26, 2005).
Notice of Allowance for U.S. Appl. No. 10/166,968 (Sep. 20, 2005).
Notice of Allowance for U.S. Appl. No. 09/471,946 (Oct. 15, 2004).
Final Official Action for U.S. Appl. No. 09/747,070 (May 11, 2005).
Official Action for U.S. Appl. No. 09/747,070 (Jun. 30, 2004).
Supplemental Notice of Allowability for U.S. Appl. No. 09/471,946 (May 24, 2004).
"Cisco IP Transfer Point as the Signaling Gateway for the Cisco BTS 10200 Softswitch," Cisco Systems, Inc., pp. 1-10 (Summer 2004).
"Cisco IP Transfer Point as the Signaling Gateway for the Cisco PGW 2200 Softswitch," Cisco Systems, Inc., pp.1-11 (Summer 2004).
"Next-Generation Signaling Transports Cisco IP Transfer Point," Cisco Systems, Inc., pp. 1-27 (Summer 2004).
"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).
Notice of Allowance and Fee(s) Due for U.S. Appl. No. 09/471,946 (Feb. 6, 2004).
Walker, "The IP Revolution in Mobile Messaging," Packet, Cisco Systems Users Magazine, vol. 16, No. 1, pp. Cover; 73-74; and 89 (First Quarter 2004).
"Cisco ITP Multilayer Routing (MLR) SMS MO Routing Requirements," Cisco Systems, Inc., p. 1 (Copyright 2004).
"Cisco Signaling Gateway Manger Release 3.3 For Cisco IP Transfer Point," Cisco Systems, Inc., pp. 1-9 (Copyright 1992-2004).
"Solutions for Mobile Network Operators," Cisco Systems, Inc., pp. 1-8 (Copyright 1992-2004).
Official Action from European Patent Office in counterpart European Patent Application (Dec. 11, 2003).
Interview Summary for U.S. Appl. No. 09/471,946 (Dec. 9, 2003).
Communication pursuant to Article 96(2) EPC for European Application No. 00988270.5 (Nov. 12, 2003).
Notification of Transmittal of the International Search Report or the Declaration for International Application No. PCT/US2003/018266 (Oct. 31, 2003).

Office Communication for U.S. Appl. No. 09/759,743 (Oct. 20, 2003).
Official Action for U.S. Appl. No. 09/471,946 (Jul. 9, 2003).
Moodie, "Agilent acceSS7: White Paper," Agilent Technologies, pp. 1-14 (Apr. 1, 2003).
Notice of Allowance and Fee(s) Due for U.S. Appl. No. 09/759,743 (Mar. 10, 2003).
Interview Summary for U.S. Appl. No. 09/759,743 (Feb. 27, 2003).
"Cisco IP Transfer Point," Cisco Systems, Inc., pp. 1-10 (Copyright 1992-2003).
"Cisco IP Transfer Point Multilayer Short Message Serivce Routing Solution," Cisco Systems, Inc., pp. 1-6 (Copyright 1993-2003).
"Cisco ITP MAP Gateway for Public WLAN Slm Authentication and Authorization," Cisco Systems, Inc., pp. 1-13 (Copyright 1992-2003).
Final Official Action for U.S. Appl. No. 09/759,743 (Dec. 2, 2002).
Barry, "A Signal for Savings," Packet, Cisco Systems Users Magazine, vol. 14, No. 4, pp. Cover; 19-21; and 81 (Fourth Quarter 2002).
Interview Summary for U.S. Appl. No. 09/759,743 (Sep. 13, 2002).
Official Action for U.S. Appl. No. 09/759,743 (May 23, 2002).
Interview Summary for U.S. Appl. No. 09/759,743 (Mar. 6, 2002).
"Agilent Tchnologies and Cisco Systems SS7 Over IP White Paper," Cisco Systems, Inc. and Agilent and Technologies, pp. 1-6 (Copyright 2002—Printed in the UK Feb. 1, 2002).
"Cisco IP Transfer Point: MTP3 User Adaptation (M3UA) and SCCP User Adaptation (SUA) Signaling Gateway," Cisco Systems, Inc., pp. 1-14 (Copyright 2002).
"Cisco SS7 Port Adapter for the Cisco 7500 Versatile Interface Processor and 7200 VXR Routers Provide High-Density SS7 Agrregation," Cisco Systems, Inc., pp. 1-5 (Copyright 1992-2002).
"Next-Generation SS7 Networks with the Cisco IP Transfer Point," Cisco Systems, Inc., pp. 1-14 (Copyright 1992-2002).
Notification of Transmittal of International Preliminary Examination Report for International Application No. PCT/US1999/030861 (Dec. 28, 2001).
Official Action for U.S. Appl. No. 09/759,743 (Dec. 3, 2001).
International Preliminary Examination Report for International Application No. PCT/US01/01052 (Nov. 7, 2001).
The attached email dated Oct. 20, 2001 and PowerPoint presentation dated Oct. 24, 2001 disclose an MSISDN-based auto-provisioning solution proposed by a customer of the assignee of the presend application.
"Agilent acceSS7 Business intelligence," Agilent Technologies, pp. 1-6 (Copyright 2001—Printed in the UK Nov. 30, 2001).
International Search Report for International Application No. PCT/US00/34924 (May 16, 2001).
"Cisco IP Transfer Point (ITP Network Management Product Presentation," Cisco Systems, Inc., pp. 1-20 (Copyright 2001).
"Networkers," Cisco Systems, Inc., pp. 1-60 (Copyright 2001).
"Cisco SS7 Signaling Offload," Cisco Systems, Inc., pp. 1-33 (Copyright 1992-2001).
Rockhold, "Or," Wireless Review, p. 22, 23, 26, 28, 30, 32, (Aug. 15, 2000).
Notification of Transmittal of the International Search Report or the Declaration for International Application No. PCT/US1999/030861 (Mar. 17, 2000).
"Topsail Beach-SS7 Over IP-" Cisco Systems, Inc., pp. 1-16 (Copyright 1999).
ETSI, "Digital Cellular Telecommunications Systems (Phase 2++); Support of Mobile Number Portability (MNP); Technical Realisation; Stage 2," Global System for Mobile Communications, p. 1-71, (1998).
Smith, "Number Portability Pileup," Telephony, p. 22, 24, 26, (Jan. 6, 1997).
Jain et al., "Phone Number Portability for PCS Systems with ATM Backbones Using Distributed Dynamic Hashing," IEEE, vol. 15 (No. 1), p. 96-105, (Jan. 1997).
Heinmiller, "Generic Requirements for SCP Application and GTT Function for Number Portability," Illinois Number Portability Workshop, p. 1-50, (Sep. 4, 1996).
International Telecommunication Union, "Series Q: Switching and Signalling: Specifications of Signalling Systems No. 7—Signalling Connection Control Part," p. 11-16, (Jul. 1996).
Rice, "SS7 Networks in a PCS World," Telephony, pp. 138, 140 142, 144, 146, (Jun. 24, 1996).
Tekelec, "Eagle STP Planning Guide", Eagle Network Switching Division, (No. 3), p. i-vii, 1-64, A1-A2, B1-2, (May 1996).
Anonymous, "Generic Switching and Signaling Requirements for Number Portability," AT&T Network Systems, No. 1, p. 1-75, (Feb. 2, 1996).
ETSI, Digital Cellular Telecommunications System (Phase 2+); Milbe Application Part (MAP) Specification, Global System for Mobile Communications, pp. 112-114 (1996).
Jain, et al., "A Hashing Scheme for Phone Number Portability in PCS Systems with ATM Backbones," Bell Communications Research, p. 593-597, (1996).
Bishop, "Freeing the Network for Competition," Telecommunications, p. 75-80, (Apr. 1995).
Anonymous, "Zeichengabesysteme-Eine neue Generation für ISDN und Intelligente Netze," Zeichengabesystem, Medien-Institut Bremen, p. iz-xi; 170-176, (Feb. 17, 1995).
Giordano et al., "PCS Numger Portability," IEEE, p. 1146-1150, (Sep. 1994).
Bellcore, "Signaling Transfer Point (STP) Generic Requirements," Bell Communications Research, No. 1, p. ii-xxii, 4-84-J14, (Jun. 1994).
Telcordia Technologies, "CCS Network interface Specification (CCSNIS) Supporting SCCP and TCAP," Bell Communications Research, p. ii-xii, 1-1-C-22, (Mar. 1994).
Buckles, "Very High Capacity Signaling Trnsfer Point for Intelligent Network Servcies," DSC Communciations Corporation, p. 1308-1311, (1988).
"Chapter 1: Overview," SS7 Port Adapter Installation and Configuration, pp. 1-1-1-8 (Publication Date Unknown).
"Configuring ITO Basic Functionally," IP Transfer Point, Cisco IOS Release 12.2(4)MB12, pp. 31-50 (Publication Date Unknown).
"Configuring ITP Optional Features," IP Transfer Point, Cisco IOS Release 12.294)MB12, pp. 65-136 (Publication Date Unknown).
"Configuring M3UA and SUA SS7 Over IP Signaling Gateways," IP Transfer Point, Cisco IOS Release 12.2(4)MB13, pp. 51-66 (Publication Date Unknown).
"Configuring M3UA and SUA SS7 Over IP Signaling Gateways," IP Transfer Point, Cisco IOS Release 12.2(4)MB10, pp. 49-62 (Publication Date Unknown).
Notification of Transmittal of the International Search Report and the Written Opinion of the International Searching Authority, or the Declaration for International Application No. PCT/US2010/034372 (Nov. 30, 2010).
Commonly assigned, co-pending U.S. Appl. No. 12/906,998 for, "Methods, Systems, and Computer Readable Media for Providing Diameter Signaling Router with Firewall Functionality," (Unpublished, filed Oct. 18, 2010).
Commonly assigned, co-pending U.S. Appl. No. 12/906,816 for, "Methods, Systems, And Computer Readable Media For Providing Diameter Signaling Router With Integrated Monitoring Functionality," (Unpublished, filed Oct. 18, 2010).
Notice of Allowance and Fee(s) Due for U.S. Appl. No. 11/291,502 (Oct. 5, 2010).
Communication pursuant to Article 94(3) EPC for European application No. 07810606.9 (Aug. 26, 2010).
Communication pursuant to Article 94(3) EPC for European application No. 03734522.0 (Aug. 9, 2010).
Official Action for U.S. Appl. No. 11/364,759 (Aug. 16, 2010).
Official Action for U.S. Appl. No. 11/605,837 (Jul. 20, 2010).
Communication Pursuant to Article 94(3) EPC for European Application No. 06844747.7 (May 11, 2010).
Notice of Allowance and Fee(s) Due for U.S. Appl. No. 11/879,737 (Apr. 22, 2010).
Interview Summary for U.S. Appl. No. 11/364,759 (Apr. 21, 2010).
Supplemental European Search Report for European application No. 03734522.0 (Feb. 23, 2010).
Communication pursuant to Article 94(3) EPC for European application No. 07810606.9 (Feb. 12, 2010).
Final Official Action for U.S. Appl. No. 11/291,502 (Feb. 4, 2010).
Final Official Action for U.S. Appl. No. 11/364,759 (Jan. 21, 2010).

Chinese Official Action for Chinese Patent Application No. 200780012095.7 (Jan. 8, 2010).
Supplementary European Search Report for European application No. 07810606.9 (Nov. 23, 2009).
Supplementary European Search Report for European Patent No. 1676386 (Oct. 30, 2009).
Official Action for U.S. Appl. No. 11/879,737 (Sep. 30, 2009).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 9)," 3GPP TS 29.272, V9.0.0, pp. 1-71 (Sep. 2009).
Final Official Action for U.S. Appl. No. 11/879,737 (Jun. 9, 2009).
Official Action for U.S. Appl. No. 11/364,759 (Mar. 30, 2009).
Notification of Transmittal of the International Search Report and the Written Opinion of the International Searching Authority, or the Declaration for International Application No. PCT/US07/16370 (Sep. 15, 2008).
Official Action for U.S. Appl. No. 11/879,737 (Sep. 15, 2008).
Notification Concerning Transmittal of International Preliminary Report on Patentability for Internation Application No. PCT/US2007/002520 (Aug. 21, 2008).
Notification of Transmittal of the International Search Report and the Written Opinion of the International Searching Authority, or the Declaration for Internation Application No. PCT/US07/02520 (Mar. 3, 2008).
Notification of Transmittal of the International Search Report and Written Opinion of the International Searching Authority, or the Declaration for International Application No. PCT/US07/13732 (Jan. 29, 2008).
Jones, "The Definitive Guide to Scaling Out SQL Server," http://www.snip.gob.ni/Xdc/SQL/DGSOSSFinal.pdf (Retrieved on Aug. 16, 2010) (2005).
Final Official Action for U.S. Appl. No. 11/635,406 (Apr. 5, 2011).
Official Action for U.S. Appl. No. 11/982,549 (Feb. 24, 2011).
"Ericsson Unified Number Portability," (Downloaded from the Internet on Jan. 24, 2011).
Chinese Official Action for Chinese Patent Application No. 200680051295.9 (Dec. 24, 2010).
Official Action for U.S. Appl. No. 11/635,406 (Aug. 26, 2010).
Tsou et al., "Realm-Based Redirection In Diameter," draft-ietf-dime-realm-based-redirect-03, RFC 3588, pp. 1-6 (Jul. 12, 2010).
"3rd Generation Partnership Project; Technical Specification Group Core Network and Terminals; Policy and Charging Control signalling flows and Quality of Service (QoS) parameter mapping (Release 9)," 3GPP TS 29.213, V9.2.0, pp. 1-129 (Mar. 2010).
Korhonen et al., "Clarifications on the Routing of Diameter Requests Based on the Username and the Realm,". RFC 5729, pp. 1-9 (Dec. 2009).

Communication of European publication number and information on the application of Article 67(3) EPC for European application No. 0786756637 (Aug. 12, 2009).
Communication of European publicationnumber and information on the application of Article 67(3) EPC for European Application No. 07810606.9 (Mar. 18, 2009).
Notification of Transmittal of the International Search Report and the Written Opinion of the International Searching Authority, or the Declaration for International Application No. PCT/US07/24418 (May 1, 2008).
"3rd Generation Partnership Project; Technical Specification Group Services and System Aspects; Policy and charging control architecture (Release 8)," 3GPP TS 23.203, V8.1.1, pp. 1-87 (Mar. 2008).
Lucent Technologies, "ENUM Use and Management for the Successful Deployment of ENUM-Enabled Services; Understand ENUM and its Deployment to Insure Success of your VoIP and Other ENUM-enabled Services," White Paper, pp. 1-12 (Jul. 2006).
Notification of European publication number and information on the application of Article 67(3) EPC for European Application No. 04751843.6 (Dec. 29, 2005).
Notification of European Publication Number and Information on the Application of Article 67(3) EPC for European Application No. 03734522.0 (Mar. 23, 2005).
Schwarz, "ENUM Trial to Link Phone, Internet Addresses, " (Mar. 22, 2005)
Peterson, "Telephone Number Mapping (ENUM) Service Registration for Presence Services, " Networking Group, RFC 3953 (Jan. 2005).
3GPP, "3rd Generation Partnership Project; Technical Specification Group Core Network; Support of Mobile Number Portability (MNP); Technical Realization; Satge 2 (Release 6), " 3GPP TS 23.066, V6.0.0, pp. 1-83 (Dec. 2004).
Peterson et al., "Using E.164 Numbers With the Session Inititation Protocol (SIP), " Network Working Group, RFC 3824, pp. 1-14 (Jun. 2004).
Cisco, "Quality of Service Networks, " Internetworking Technologies handbook, Chapter 49, pp. 49-1—49-32 (Sep. 11, 2003).
Foster et al., "Number Portability in the Global Switched Telephone Network (GSTN); An Overview," Network Working Group, RFC 3482 (Feb. 2003).
"Global Implementation of ENUM: A Tutorial Paper, " International Telecommunication Union, Telecommunication Standardization Union, Study Group 2, (Feb. 8, 2002).
Mealling, "The Naming Authority Pointer (NAPTR) DNS Resource Record," Networking Working Group, RFC 2915 (Sep. 2000).
Neustar, "ENUM: Driving Convergence in the Internet Age, " pp. 1-5 (Publication Date Unknown).

* cited by examiner

METHODS, SYSTEMS, AND COMPUTER PROGRAM PRODUCTS FOR IDENTIFYING A SERVING HOME SUBSCRIBER SERVER (HSS) IN A COMMUNICATIONS NETWORK

RELATED APPLICATIONS

This application claims the benefit of U.S. Provisional Patent Application Ser. No. 60/934,703, filed Jun. 15, 2007; the disclosure of which is incorporated herein by reference in its entirety.

TECHNICAL FIELD

The subject matter described herein relates to optimizing a subscriber locator function (SLF) in an IP multimedia subsystem (IMS). More particularly, the subject matter described herein relates to methods, systems, and computer program products for identifying a serving home subscriber server (HSS) in a communications network.

BACKGROUND

Internet protocol (IP) multimedia subsystem (IMS) is defined by the Third Generation Partnership Project (3GPP) as a mobile network infrastructure that enables the convergence of data, speech, and mobile network technology over an IP-based infrastructure. IMS bridges the gap between the existing traditional telecommunications technology and Internet technology, allowing network operators to offer a standardized, reusable platform with new, innovative services by enhancing real time, multimedia mobile services, such as voice services, video telephony, messaging, conferencing, and push services. IMS can be used to provide services for both mobile networks and fixed networks at the same time, providing unique mixtures of services with transparency to the end-user.

IMS supports the establishment of any type of media session (e.g., voice, video, text, etc.) and provides the service creator the ability to combine services in the same session and dynamically modify sessions (e.g., adding a video component to an existing voice session). As a result, new and innovative user-to-user and multi-user services have become available, such as enhanced voice services, video telephony, chat, push-to-talk, and multimedia conferencing, all of which are based on the concept of a multimedia session. The underlying IMS infrastructure enables mobile IP communication services via its ability to find a user in the network and then to establish a session with the user. The key IMS components enabling mobility management are the call session control function (CSCF) and home subscriber server (HSS). The CSCF is essentially a proxy, which aids in the setup and management of sessions and forwards messages between IMS networks. The HSS holds all of the key subscriber information and enables users (or servers) to locate and communicate with other end users.

As the number of subscribers or processing load on an individual HSS increases, it may be desirable for a network operator to include multiple HSSs in a network. If each of the multiple HSSs is identically provisioned, i.e., includes copies of the same subscriber data, the HSSs may operate in a load sharing manner and it is not necessary to have a location function to determine which HSS holds a particular subscriber's data. However, if the multiple HSSs do not include identical data, it is necessary to identify the HSS that contains a particular subscriber's data when attempting to establish a call involving that subscriber. IMS documentation defines a subscriber locator function (SLF) for locating the HSS serving a particular subscriber when the subscriber's network includes multiple HSS functions. However, the implementation of the SLF is not believed to be specified.

Accordingly, there exists a need for improved methods, systems, and computer program products for identifying a serving home subscriber server in a communications network.

SUMMARY

According to one aspect, the subject matter described herein comprises methods, systems, and computer program products for identifying a serving home subscriber server (HSS) in a communications network. One method includes obtaining a subscriber identifier from a message. An exceptions-based data structure contained in a database is accessed to locate a database entry associated with the subscriber identifier. Similarly, a range-based data structure contained in the database is accessed to locate the database entry associated with the subscriber identifier if the exceptions-based data structure does not contain the database entry. The method also includes acquiring serving HSS data that corresponds to the located entry from either the exceptions-based data structure and the range-based data structure.

The subject matter described herein for identifying a serving HSS may be implemented using a computer program product comprising computer executable instructions embodied in a computer readable medium. Exemplary computer readable media suitable for implementing the subject matter described herein includes disk memory devices, programmable logic devices, and application specific integrated circuits. In addition, a computer readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
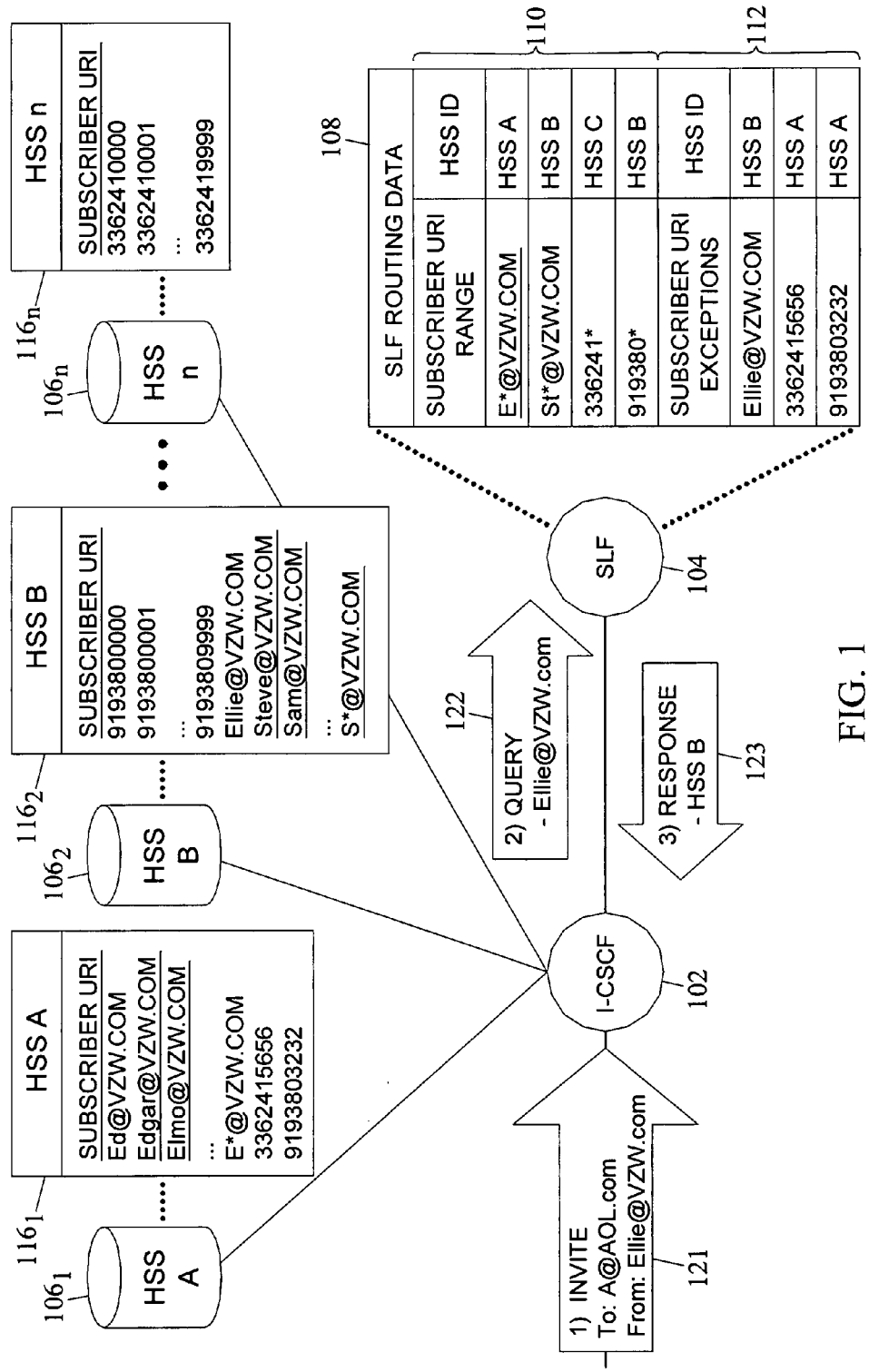
FIG. 1 is a network diagram illustrating exemplary communications network adapted to identify a serving home subscriber server according to an embodiment of the subject matter described herein.

The present subject matter relates to systems and methods for identifying a serving home subscriber server (HSS) in a communications network. FIG. 1 illustrates an exemplary communications network 100 in which the present subject matter may be implemented according to an embodiment of the subject matter described herein.

Referring to FIG. 1, network 100 may include an interrogating call session control function (I-CSCF) 102, a subscriber location function (SLF) 104, and a plurality of home subscriber servers (HSS) $106_1 ..._n$. I-CSCF 102 and SLF 104 may each be located and supported by separate application servers in network 100. In other embodiments of the present subject matter, SLF 104 may be co-located/integrated with a network element, such as a CSCF element. In one embodiment, network 100 includes an IMS network.

In one embodiment, I-CSCF 102 may be adapted to receive a call signaling message (e.g., message 121), such as a SIP INVITE message, sent from a calling party (e.g., a calling subscriber) to a called party (e.g., a called subscriber). In an alternate embodiment, a proxy call session control function (P-CSCF) may be adapted to receive the call signaling message. In response to receiving message 121, I-CSCF 102 (or P-CSCF) is configured to subsequently obtain subscriber information (e.g., a subscriber identifier associated with the calling subscriber, such as the calling subscriber number) from the call signaling message. In order to locate a serving HSS of the calling subscriber (which is needed to further service the call), I-CSCF 102 transmits a query message 122 containing the subscriber information to SLF 104.

In one embodiment, SLF 104 is a function that resides on a dedicated application server in network 100. SLF 104 may include database 108, which may be accessed in response to receiving query message 122, which is specifically addressed to SLF 104. Namely, SLF 104 serves the function of storing and providing HSS identification information that identifies a serving HSS node for a given calling subscriber and does not intercept any messages directed to an HSS node or other like registry node (e.g., an HLR). In one embodiment, database 108 may include a hierarchical data structure that contains a range-based section 110 that is made up of block sections or ranges of subscriber identifiers (e.g., subscriber URI values) and corresponding HSS identifiers. Likewise, database 108 may also contain an exceptions-based section 112, which includes subscriber identifiers (i.e., subscriber URI values) that are exceptions to the subscriber identifier-to-HSS identifier associations in ranged-based section 110. The relationship between the two sections is described below in greater detail.

In one embodiment, range-based section 110 contains subscriber identifier data that may include ranges of SIP:URI, TEL:URI, Mailto:URI, or other URI values. Each entry in section 110 includes an alphabetic or numeric (e.g., E.164 formatted subscriber identifiers, mobile subscriber ISDN identifiers, plain old telephone service (POTS) identifiers, international mobile station identifiers (IMSI), etc.) range of subscriber identifiers, as defined by the wild card or "*" character in each entry. For example, the entry indicated by E* at VZW.com may include all subscriber URIs within the VZW.com domain that begin with "E". In another example, the entry indexed by 336241* may correspond to a range of subscriber directory numbers from 3362410000-3362419999. It should also be noted that the wild card operator is shown in database 108 for illustrative purposes. In an actual implementation, ranges may be identified by values that indicate the start and end of a range. For example, a range of telephone numbers for 9193800000 to 9193809999 may be identified by the telephones at the endpoints of the range, i.e., 9193800000 and 9193809999. Any suitable method for identifying a range is intended to be within the scope of the subject matter described herein.

By utilizing a data structure that employs a range (or block) of subscriber identifiers as opposed to numerous single entries of subscriber identifiers that represent the exact same information, database 108 is capable of storing more subscribers (and serving HSS identification data) in the same amount of space. This configuration also allows for more efficient lookups since fewer entries need to be accessed as SLF 104 attempts to locate an entry that matches the subscriber identifier received in message 122.

Subscriber identifier section 112 of database 108 may include a database section that contains entries of individual subscriber identifier values, such as a SIP:URI value or a Mailto:URI value. Each subscriber identifier entry in section 112 may be associated with a corresponding HSS identifier. Exceptions-based subscriber identifier section 112 may also include numeric or Tel:URI values, such as POTS or mobile telephone numbers. For example, the URI value Ellie@VZW.com or the telephone number 9193803232 may be included in the exceptions-based data. Each URI value in section 112 has a corresponding HSS identifier (e.g., Ellie@VZW.com is associated with HSS B). In an alternate embodiment, an entry in exceptions-based section 112 may include a range or block of entries not unlike the format in section 110.

As used herein, the term "range-based data" refers to a grouping of data by numeric, alphabetic, or alphanumeric ranges. For example, a range-based grouping of telephone numbers may include a group of telephone numbers that fall within a numeric range. In another example, a range-based grouping of URIs may be all URIs that fall within the same alphanumeric range. The term "exceptions-based-data" refers to data that is within one of the ranges or groupings of range based data or outside of all of the groupings or ranges of range based data. For example, the number 3362415656 in exceptions-based section 112 of database 108 is within the range of 3362410000-3462419999 specified in range based section 110. However, 3362415656 contains a different HSS identifier to the range defined for 336241*. Accordingly, the HSS identification rule for the entry corresponding to 3362415656 is an exception to the rule defined for the remaining entries in the range 336241*. It will be appreciated that according to one embodiment, range-based section 110 of SLF database 108 may be thought of as default SLF routing rules, which are only utilized in the event that an exception-based SLF routing rule could not be located.

Upon receiving a query message (e.g., message 122), SLF 104 initially access and searches exceptions-based section 112 using the subscriber identifier. Namely, SLF 104 compares and attempts to match the subscriber URI with the URI entries in section 112 via a cross-referenced comparison. If a matching entry is found in exceptions-based section 112, then the associated HSS identification data is obtained and provided to the requesting entity (e.g., I-CSCF 102). If a match is not located in the exceptions-based section 112, then range-based section 110 is subsequently searched using the subscriber identifier. In one embodiment, SLF 104 searches section 110 to determine if the subscriber identifier falls within a designated range specified by an entry.

If a "match" (i.e., if subscriber identifier falls within a range) is located in the ranged-based section 110, then the associated HSS identifier is obtained and provided to the requesting entity. If a match is not located, then a default HSS identifier may be returned or an error indicator may be returned to the requesting entity.

For example, referring to database 108 in FIG. 1, Ellie@VZW.com is listed as an exception in section 112. The first entry in section 110 indicates that Ellie@VZW.com would normally be associated with HSS A. Notably, the first entry of section 210 includes a wildcard operator that indicates that all identifiers starting with the letter "E" in the VZW.com domain are supported by HSS A. However, since Ellie@VZW.com is listed as an exception in section 112, this particular subscriber URI is instead supported by HSS B (as indicated) as opposed to HSS A.

Figure 2A:
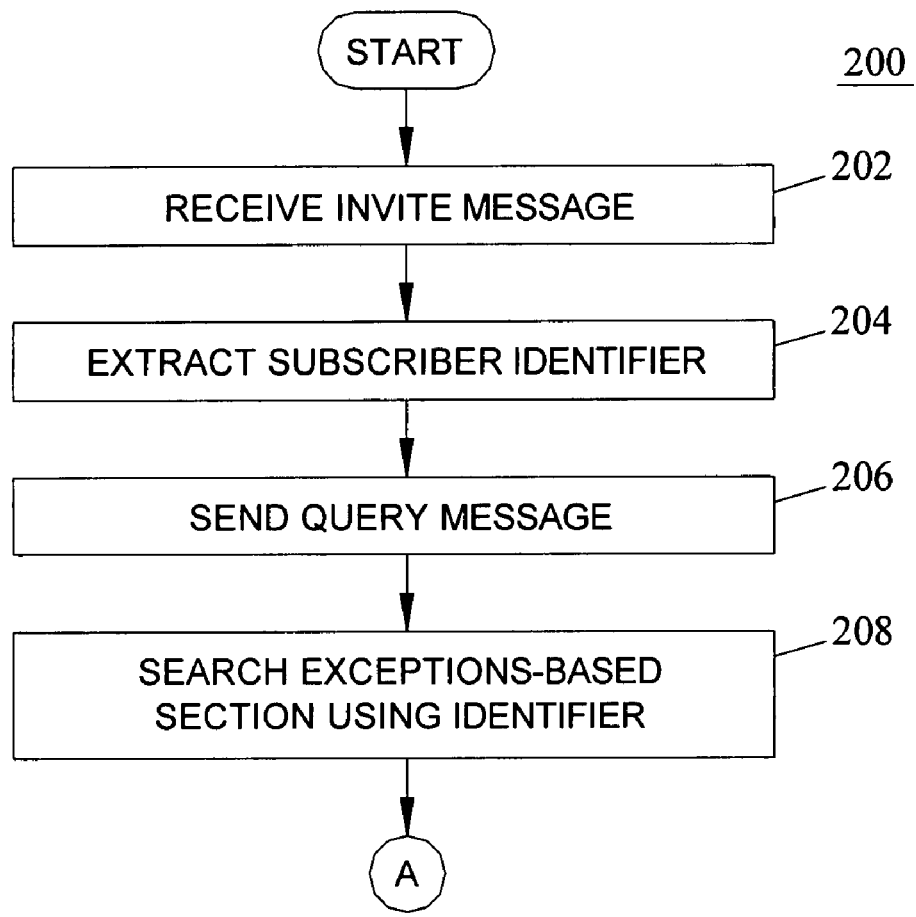
FIG. 2 is a flow chart illustrating exemplary steps for identify a serving home subscriber server in a communications network according to an embodiment of the subject matter described herein.
Figure 2B:
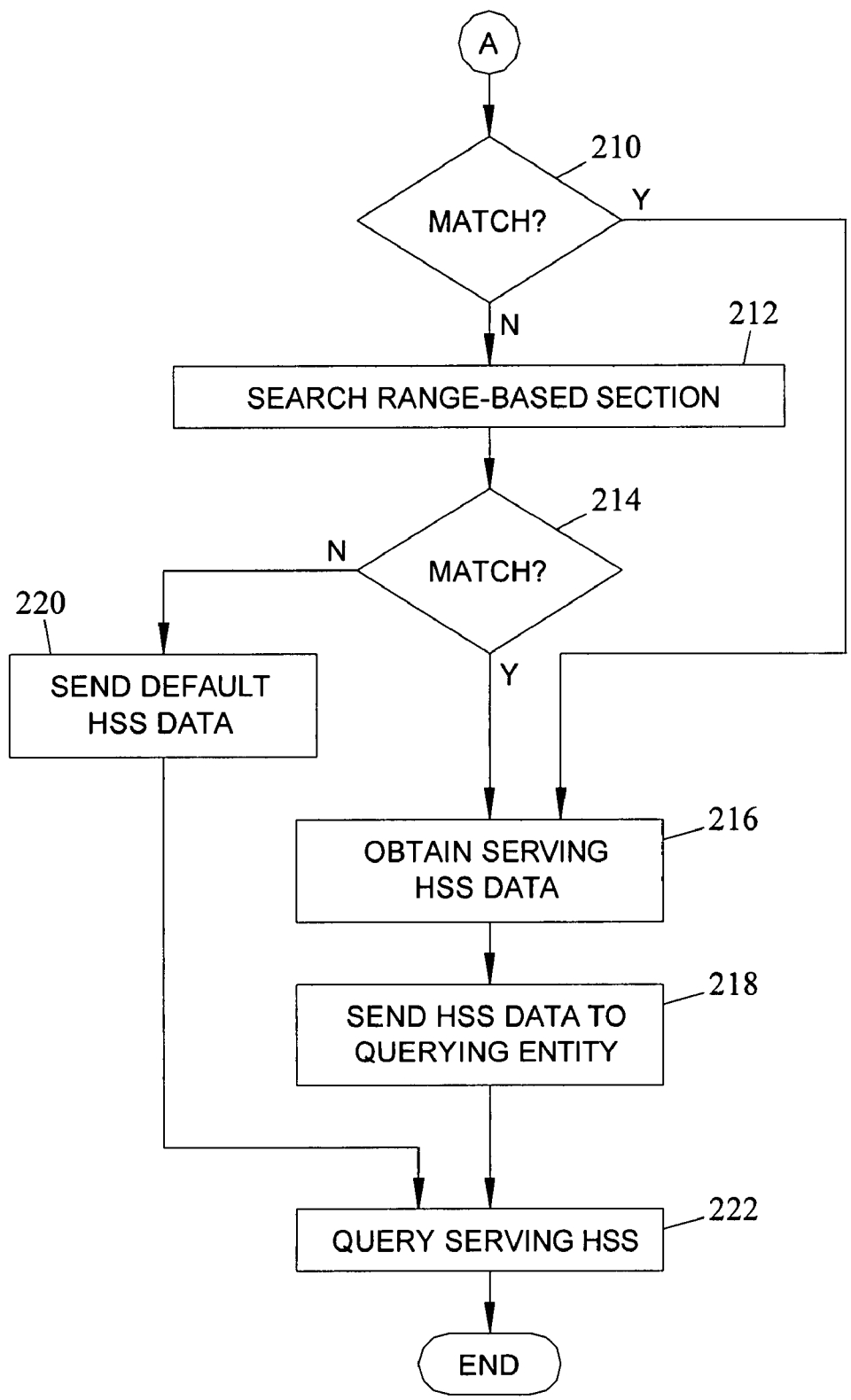

FIG. 2 is a flow chart illustrating the exemplary steps of a method 200 for determining a serving HSS in a communications network according to an embodiment of the subject matter described herein. In block 202, a call setup message is received. In one embodiment, I-CSCF 102 receives a SIP INVITE message (e.g., message 121 in FIG. 1) intended for a designated called subscriber from a calling subscriber. The INVITE message may include this called and calling subscriber information in the "To" and "From" parameters, respectively, of the message header.

In block 204, the subscriber identifier is obtained from the call signaling message. In one embodiment, I-CSCF 102 extracts a subscriber URI from INVITE message 121.

In block 206, a query message is sent to an SLF. For example, I-CSCF 102 transmits an SLF query message (e.g., query message 122 in FIG. 1), which includes the subscriber identifier, to SLF 104. In one embodiment, query message 122 may be a Diameter query message that includes the subscriber URI value. In this scenario, the connection between I-CSCF 102 and SLF 104 may include a Diameter interface.

In block 208, an exceptions data structure is searched using the subscriber identifier. In one embodiment, SLF 104 utilizes the received subscriber identifier to initially query an exceptions-based section 112 of database 108. As mentioned above, exceptions-based section 112 of database 108 includes a list of individual subscriber identifier values (or "sub-ranges" of subscriber identifier values) that are exceptions to the range-based entries in section 110.

In block 210, a determination is made as to whether the subscriber identifier matches one of the entries in exceptions-based section 212. In one embodiment, SLF 104 compares the subscriber identifier contained in query message 122 with the entries in section 112. If a matching entry is not found in exceptions-based section 112 by SLF 104, then method 200 continues to block 212. If a matching entry is found, then method 200 proceeds to block 216.

In block 212, a range-based data structure is searched using the subscriber identifier. In one embodiment, SLF 104 utilizes the received subscriber identifier to query a range-based section 112 of database 108 (since SLF 104 did not find an exception that matched the subscriber identifier). For example, SLF 104 compares the subscriber identifier with the ranges listed in section 110 to determine if the subscriber identifier falls within a particular range.

In block 214, a determination as to whether the subscriber identifier is included within a particular range listed in section 110. If a "match" is found (i.e., subscriber identifier is within a listed range), then method 200 continues to block 216. If a "match" is not found, then method 200 proceeds to block 220, where a predefined default HSS identifier is returned to I-CSCF 102. Alternatively, an error message may be sent to I-CSCF 102 indicating that a serving HSS cannot be found in either section 110 or section 112.

In block 216, the serving HSS identification data is obtained. In one embodiment, the SLF 104 acquires the serving HSS identification data associated with the subscriber identifier from database 108 (i.e., either from exceptions section 112 or range section 110). For example, SLF 104 obtains the HSS identifier that corresponds to the matched exceptions-based section entry.

In block 218, the serving HSS identification data (e.g., HSS identifier) is sent to the original querying entity. In one embodiment, after finding a match from either section 110 or section 112, SLF 104 transmits the HSS identification data associated with the subscriber identifier to I-CSCF 102.

In block 222, the serving HSS is queried. In one embodiment, I-CSCF 102 uses the HSS identifier to query the appropriate HSS (e.g., one HSS of HSSs $106_{1...n}$). In one embodiment, I-CSCF 102 attempts to obtain the identity of the S-CSCF that is designated to handle the subscriber's call from the queried HSS.

Figure 3:
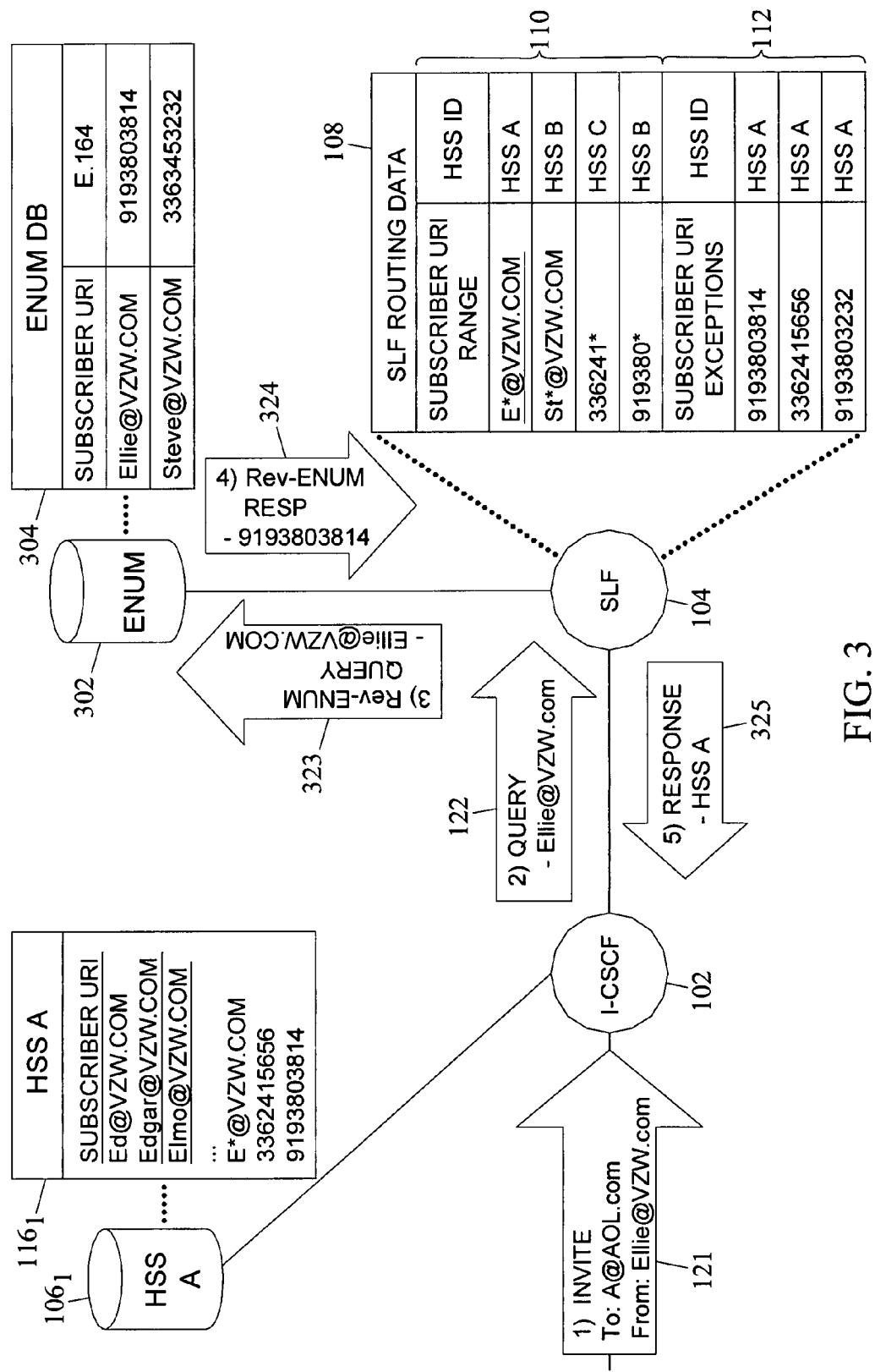
FIG. 3 is a network diagram illustrating exemplary communications network adapted to identify a serving home subscriber server using an E.164 identifier according to an embodiment of the subject matter described herein.

In one embodiment, the subject matter described herein may include querying an E.164 number mapping (ENUM) server in order to obtain an E.164 number, which may be used as a subscriber identifier to access an SLF routing data structure (e.g., database 108). FIG. 3 illustrates an exemplary communications network 300 in which the present subject matter may be implemented according to an embodiment of the subject matter described herein. In one embodiment, network 300 is similar to network 100 except for the addition of ENUM server 302 (e.g., a computer supporting an E.164-to-URI mapping function) and ENUM database 304. One reason that it may be desirable to identify an E.164 number corresponding to a URI is that E.164 numbers can be used as access keys to entries corresponding to numeric ranges and exceptions to those ranges in database 108. A query that seeks, from an ENUM server, an E.164 number corresponding to a URI is referred to herein as a reverse ENUM query because such a query requests the reverse of the normal E.164 to URI mapping performed by ENUM servers.

In one embodiment, ENUM server 302 is adapted to receive a reverse ENUM query 323 from SLF 104. Query 323 may include a subscriber identifier, such as a subscriber URI, that is initially received by SLF 104. After receiving query 323, ENUM server 302 uses the subscriber identifier to access database 304 in order to obtain an associated E.164 number via a URI-to-E.164 number translation. In one embodiment, ENUM database 304 may include a data structure that contains a plurality of URIs and corresponding E.164 numbers (see FIG. 3). The associated E.164 number resulting from the reverse ENUM translation is then provided to SLF 104. SLF 104 then uses the E.164 number and is used to search an SLF data structure (e.g., database 108) and determine the serving HSS for the subscriber associated with the E.164 number in a similar manner mentioned above.

Figure 4A:
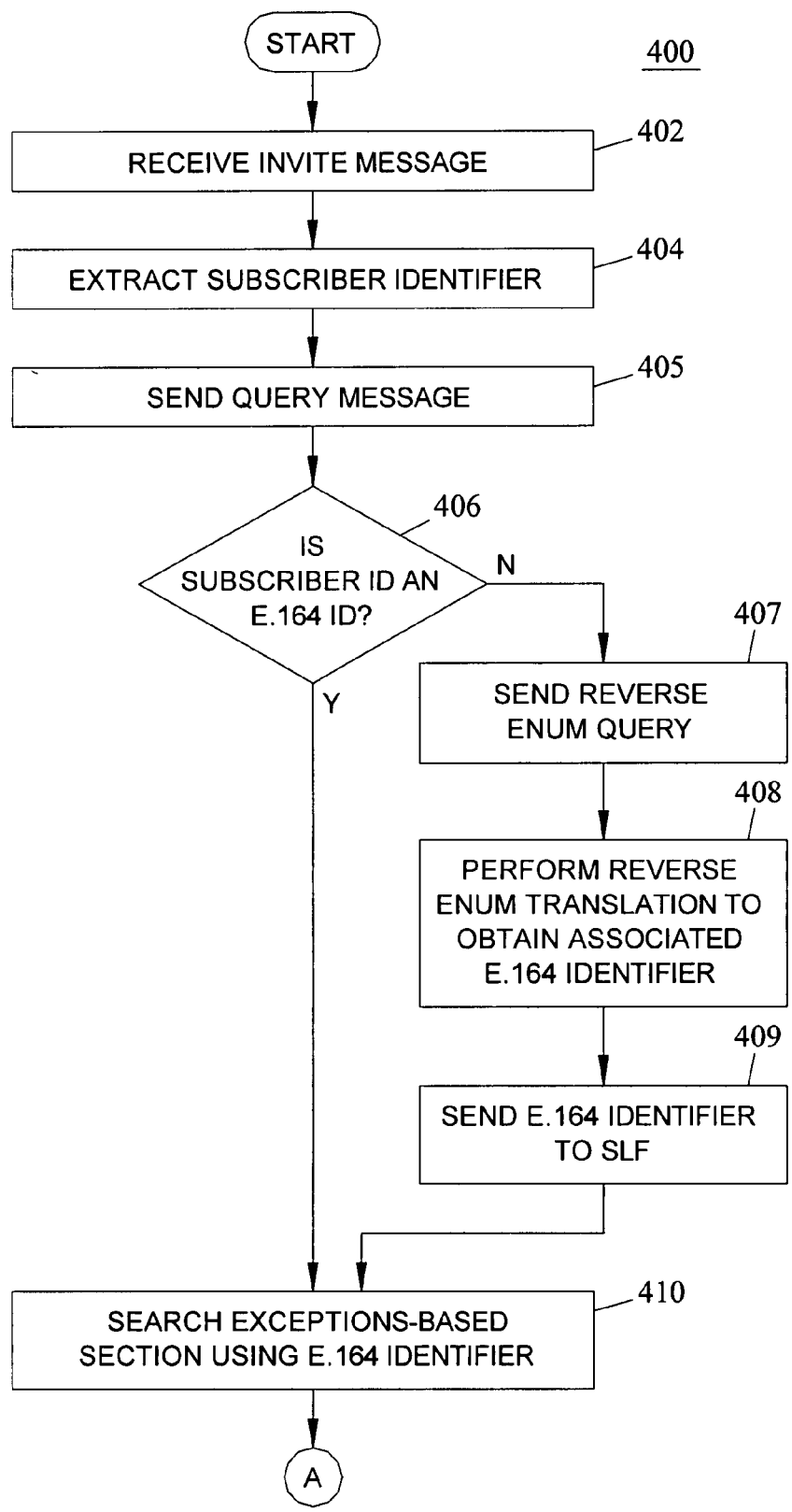
FIG. 4 is a flow chart illustrating exemplary steps for identifying a serving home subscriber server using an E.164 identifier in a communications network according to an embodiment of the subject matter described herein.
Figure 4B:
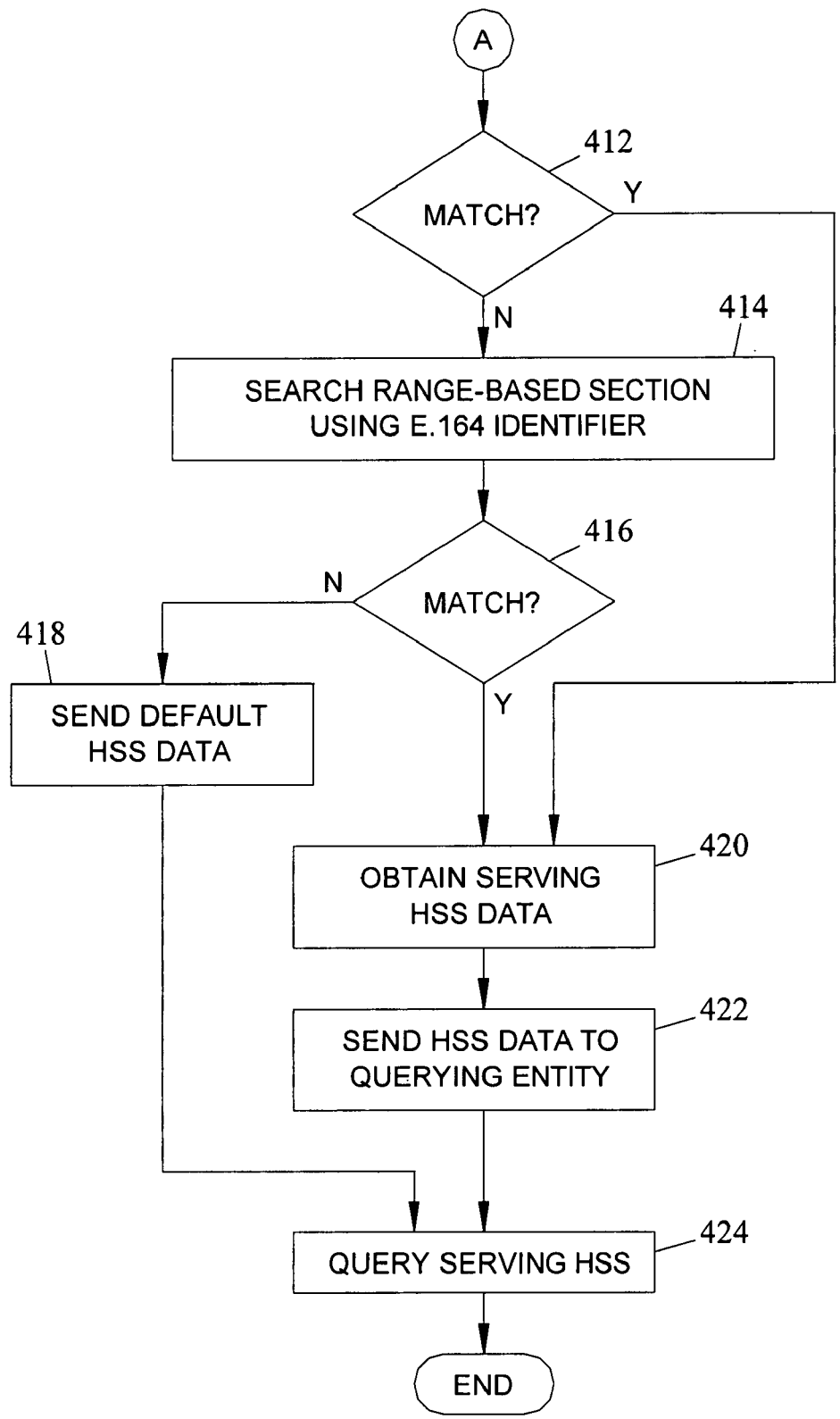

FIG. 4 is a flow chart illustrating the exemplary steps of a method 400 for determining a serving HSS using an E.164 number in a communications network according to an embodiment of the subject matter described herein. In block 402, a call setup message is received. In one embodiment, I-CSCF 102 receives a SIP INVITE message 121 intended for a designated called party from a calling subscriber. The INVITE message may include a subscriber identifier, such as a calling subscriber number or subscriber URI.

In block 404, the subscriber identifier is extracted from the call signaling message. In one embodiment, I-CSCF 102 extracts a subscriber URI from INVITE message 121.

In block 405, a query message is sent to a SLF. For example, I-CSCF 102 transmits an SLF query message (e.g., query message 122), which includes the subscriber identifier, to SLF 104.

In block 406, a determination is made as to whether the subscriber identifier is an E.164 identifier. In one embodiment, SLF 104 analyzes the subscriber identifier to ascertain whether it is an E.164 based identifier. In one embodiment, SLF 104 recognizes the subscriber identifier to be a subscriber URI that may be associated to an E.164 number. If the subscriber identifier is found to be an E.164 number, then method 400 proceeds to block 410 and continues normally.

If the subscriber identifier is found not to be an E.164 identifier, then method 400 continues to block 407, where a reverse-ENUM query message containing the subscriber identifier is sent to ENUM server 302. In block 408, ENUM server 302 receives the query message and performs a reverse ENUM translation to obtain an E.164 number associated with the subscriber identifier from the ENUM database 304. In block 409, the E.164 number is sent to SLF 104 via a reverse response message 324.

In block 410, an exceptions data structure is searched using the subscriber identifier. In one embodiment, SLF 104 utilizes the E.164 number contained in message 324 to initially query an exceptions-based section 112 of database 108.

In block 412, a determination is made as to whether the E.164 number matches one of the entries in exceptions-based section 112. In one embodiment, SLF 104 compares the E.164 number contained in message 122 with the entries in section 112. If a matching entry is not found in exceptions-based section 112 by SLF 104, then method 400 continues to block 414. If a matching entry is found, then method 400 proceeds to block 420.

In block 414, a range-based data structure is searched using the subscriber identifier. In one embodiment, SLF 104 utilizes the received E.164 number to query a range-based section 112 of database 108. For example, SLF 104 compares the subscriber identifier with all of the ranges listed in section 110 to determine if the subscriber identifier falls within a particular range.

In block 416, a determination as to whether the subscriber identifier matches or falls within a particular range listed in section 110. If a match is found, then method 400 continues to block 420. If a match is not found, then method 400 proceeds to block 418, where predefined default HSS identification data is sent to I-CSCF 102. Alternatively, an error message may be sent to I-CSCF 102 indicating that a serving HSS cannot be found in either section 110 or section 112.

In block 420, the serving HSS identification data is obtained. In one embodiment, the SLF 104 acquires the serving HSS identification data associated with the E.164 number from database 108.

In block 422, the serving HSS identification data (e.g., HSS identifier) is sent to the querying entity. In one embodiment, after finding a match from either section 110 or section 112, SLF 104 transmits the HSS identification data associated with the E.164 number to I-CSCF 102 via a response message 325.

In block 424, the serving HSS is queried. In one embodiment, I-CSCF 102 uses the HSS identification data to query the appropriate HSS of HSS $106_{1...n}$ to obtain the identity of a serving S-CSCF. The method 400 then ends.

In yet another embodiment, it may be desirable for an ENUM translation (i.e., E.164-to-URI translation) to be performed prior to performing SLF processing. In this case, an SLF function of the present subject matter is adapted to query an ENUM function prior to performing SLF processing. For example, an SLF function may receive a query message from a CSCF node that includes a numeric subscriber identifier (e.g., E.164 formatted telephone number). The SLF is adapted to generate an ENUM query that includes the numeric subscriber identifier, and transmit the query to an ENUM function. The SLF receives an ENUM response message, which includes a subscriber URI, from the ENUM function and is adapted to use perform SLF processing (such as that described previously in this disclosure) using the returned subscriber URI.

As described above, the present subject matter relates to various methods, systems, and computer program products for identifying a serving HSS in a communications network.

For example, by employing the range-based and exceptions-based data hierarchy, the present subject matter is able to facilitate the storage of data in a highly efficient manner. Thus, more data may be stored in a fewer number of entries in a database structure. Similarly, by using the associated two-stage lookup procedure, high-speed data searches for identifying a subscriber's serving HSS in an IMS network may be realized.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for identifying a serving home subscriber server (HSS) in a communications network, comprising:
    obtaining a subscriber identifier from a message;
    accessing an exceptions-based data structure contained in a database to locate an exceptions-based database entry associated with the subscriber identifier;
    accessing a range-based data structure contained in the database to locate a range-based database entry associated with the subscriber identifier if the exceptions-based data structure does not contain the exceptions-based database entry; and
    acquiring serving HSS identification data corresponding to the located database entry,
    wherein at least one entry in the exceptions-based data structure is indexed by a subscriber identifier within a range corresponding to an entry in the range-based data structure but includes different serving HSS information from the entry in the range-based data structure.

2. The method of claim 1 wherein the message comprises a query message requesting the serving HSS data associated with the subscriber identifier.

3. The method of claim 2 wherein the query message is sent by an interrogating call session control function (I-CSCF).

4. The method of claim 2 wherein the query message is a Diameter query message.

5. The method of claim 3 comprising providing the serving HSS data to the I-CSCF.

6. The method of claim 5 comprising querying an HSS indicated in the serving HSS data to obtain serving call session control function (S-CSCF) data associated with the subscriber identifier.

7. The method of claim 1 wherein at least one entry of the range-based data structure specifies a numeric range.

8. The method of claim 1 wherein at least one entry of the range-based data structure specifies an alphabetic range.

9. The method of claim 1 wherein at least one entry in the exceptions-based data structure is indexed by a subscriber identifier that is outside of all of the ranges corresponding to entries in the range-based data structure.

10. The method of claim 1 wherein obtaining a subscriber identifier comprises initiating a reverse E.164 numbering (ENUM) lookup and obtaining a reverse ENUM response containing an E.164 subscriber number that is used as the subscriber identifier.

11. The method of claim 1 wherein obtaining a subscriber identifier comprises initiating an ENUM lookup and obtaining an ENUM response containing a URI that is used as the subscriber identifier.

12. A non-transitory computer-readable medium having stored thereon a data structure for associating subscriber identifiers with IP Multimedia Subsystem (IMS) home subscription servers (HSSs), comprising:
- (a) a range-based data structure that associates serving HSSs with ranges of subscriber identifier values; and
- (b) an exceptions-based data structure that associates serving HSSs with individual subscriber identifier values, the exceptions-based data structure including entries that are exceptions to entries in the range-based data structure,
  - wherein at least one entry in the exceptions-based data structure is indexed by a subscriber identifier within a range corresponding to an entry in the range-based data structure but includes different serving HSS information from the entry in the range-based data structure.

13. The computer-readable medium of claim 12 wherein the ranges of subscriber identifier values include a range comprising numeric values.

14. The computer-readable medium of claim 12 wherein the ranges of subscriber identifier values include a range comprising alphabetic values.

15. The computer-readable medium of claim 12 wherein at least one entry in the exceptions-based data structure is indexed by a subscriber identifier that is outside of the ranges of subscriber identifier values.

16. The computer readable medium of claim 12 wherein the message comprises a query message requesting the serving HSS data associated with the subscriber identifier and wherein the query message is a Diameter query message.

17. A system for identifying a serving home subscriber server (HSS) in a communications network, comprising:
- a database including a range-based data structure that includes range-based entries corresponding to subscriber identifier ranges and serving HSS data respectively associated with the range-based entries and an exceptions-based data structure that includes exceptions-based entries corresponding to subscriber identifiers that indicate exceptions to the entries corresponding to the subscriber identifier ranges and serving HSS data respectively associated with the exceptions-based entries, wherein at least one entry in the exceptions-based data structure is indexed by a subscriber identifier within a range corresponding to an entry in the range-based data structure but includes different serving HSS information from the entry in the range-based data structure; and
- a subscriber locator function (SLF) for accessing the exceptions-based data structure to locate an exceptions-based entry associated with a subscriber identifier, accessing the range-based data structure to locate a range-based database entry associated with the subscriber identifier if the exceptions-based data structure does not contain the exceptions-based database entry, and acquiring serving HSS data corresponding to the located database entry.

18. The system of claim 17 comprising a requesting interrogating call session control function (I-CSCF), wherein the SLF is adapted to provide the serving HSS data to the requesting I-CSCF.

19. The system of claim 18 wherein the I-CSCF is adapted to query an HSS indicated in the serving HSS data to obtain serving call session control function (S-CSCF) data associated with the subscriber identifier.

20. The system of claim 18 wherein the I-CSCF is adapted to send a Diameter query message to the SLF.

21. The system of claim 17 wherein the entries of the range-based data structure include ranges comprising numeric values.

22. The system of claim 17 wherein the entries of the range-based data structure include ranges comprising alphabetic values.

23. The system of claim 17 wherein at least one entry in the exceptions-based data structure is indexed by a subscriber identifier that is outside of all of the ranges corresponding to entries in the range-based data structure.

24. The system of claim 17 wherein the SLF is adapted to initiate a reverse E.164 number (ENUM) lookup and to obtain a reverse ENUM response containing an E.164 subscriber number that is used as the subscriber identifier.

25. The system of claim 17 wherein the SLF is adapted to initiate an ENUM lookup and to obtain an ENUM response containing a URI that is used as the subscriber identifier.

* * * * *